United States Patent [19]

Nattel

[11] 4,424,405
[45] Jan. 3, 1984

[54] ELECTRICAL WIRING BOX ARRANGEMENT

[75] Inventor: William Nattel, Montreal, Canada

[73] Assignee: GTE Sylvania Canada Limited, Montreal, Canada

[21] Appl. No.: 310,711

[22] Filed: Oct. 13, 1981

[51] Int. Cl.³ .............................................. H02G 3/08
[52] U.S. Cl. ...................................... 174/53; 220/3.2; 411/437
[58] Field of Search .................. 174/53; 220/3.2–3.94; 411/437

[56] References Cited

U.S. PATENT DOCUMENTS

| | | | |
|---|---|---|---|
| 3,876,821 | 4/1975 | Pringle | 174/53 |
| 3,952,475 | 4/1976 | Paskert | 52/578 F |
| 3,955,463 | 5/1976 | Hoehn | 411/548 |
| 4,071,158 | 1/1978 | Maheu | 220/3.2 |
| 4,105,862 | 8/1978 | Hoehn | 174/53 |
| 4,109,693 | 8/1978 | Paskert | 411/166 |
| 4,167,648 | 9/1979 | Lockwood | 174/53 |
| 4,188,854 | 2/1980 | Hoehn | 411/437 |
| 4,214,667 | 7/1980 | Lass | 220/3.2 |
| 4,281,773 | 8/1981 | Mengeu | 220/3.2 |
| 4,315,100 | 2/1982 | Haslbeck et al. | 174/51 |

OTHER PUBLICATIONS

Promotional Literature, "Self Clamp & Thread", by Highland Mfg. Company Ltd., Burnaby, B.C., Canada.

Primary Examiner—A. T. Grimley
Assistant Examiner—D. A. Tone
Attorney, Agent, or Firm—David M. Keay

[57] ABSTRACT

An electrical wiring box arrangement comprises a nonmetallic wiring box having a channel running a portion of the length of each end wall for slideably receiving a gripping member. The gripping member has two opposed body members each having a sloping face for interacting with sloping wall portions of the box wall channel, each body member further having a curved face for engaging the mounting screw of a wiring device. The mounting screw of a wiring device passes into the box wall channel and is engaged between the body portions of the gripping member. As the mounting screw is turned, the gripping member is drawn up into the box wall channel, the sloping walls of which urge the two halves of the gripping member toward one another, increasingly binding the body members down on the mounting screw.

12 Claims, 7 Drawing Figures

ELECTRICAL WIRING BOX ARRANGEMENT

CROSS REFERENCE TO RELATED APPLICATIONS

This application is related to material disclosed and claimed in co-pending application Ser. No. 310,712 filed concurrently herewith in the name of William Nattel and assigned to the present assignee.

BACKGROUND OF THE INVENTION

The mounting of electrical wiring devices in metallic wiring boxes generally presents no problem. It is a common practice to provide threaded mounting screw receiving openings in the wall structure of such boxes to permit the firm mounting of the wiring device. However, the increased use in the building trades of plastic and other non-metallic wiring boxes presents the problem of providing some means of securely mounting wiring devices in such boxes. One practice involves the simple expedient of threading screw receiving openings in the wall structure of the box. While this arrangement permits the effective mounting of the wiring device under normal circumstances, it can result in unsatisfactory mounting of the device in other cases. For example, if strain is placed on the device during mounting, it is possible to strip out the threads provided in the wall of a plastic wiring box. Even in the absence of such strain during the initial installation of a device in such boxes, the threads in the soft plastic box wall may not stand up to the removal and replacement of a wiring device in the box at some later time.

To overcome this difficulty, one known type of wiring box arrangement employs metallic screw receiving inserts which are seated in the wiring box wall structure. The use of metallic inserts may add cost to the finished wiring box arrangement, however, because of the cost of raw material and additional stamping operations required in the manufacture of the part.

SUMMARY OF THE INVENTION

Electrical wiring box arrangements in accordance with the present invention comprise, in combination, an electrical wiring box and a gripping member for engaging the mounting screw of an electrical wiring device mounted in the wiring box arrangement.

The electrical wiring box comprises a wall structure including front-to-rear walls and a rear wall therebetween which together define a chamber with a forward facing opening for receiving an electrical wiring device. The wall structure includes a support for seatably receiving and supporting the mounting yoke of the wiring device, and a mounting means for slideably receiving and retaining the gripping member.

The gripping member comprises two composed body members each having a face for coacting with the mounting means of the box wall structure and opposite curved faces for coacting with the mounting screw.

The yoke member of an electrical wiring device mounted in the wiring box arrangement of this invention seats upon and is supported by the support means, with the mounting screw passing through the yoke of the wiring device and lying between the opposed body members of the gripping member. As the mounting screw is turned, the screw is firmly engaged between the body portions of the gripping member by the cooperative action of the mounting means of the box wall structure urging the opposed body members toward one another to contact the mounting screw.

For a better understanding of the present invention, together with other and further objects, advantages, and capabilities thereof, reference is made to the following disclosure and appended claims in connection with the above-described drawings.

DESCRIPTION OF THE PREFERRED EMBODIMENTS

Figure 1:
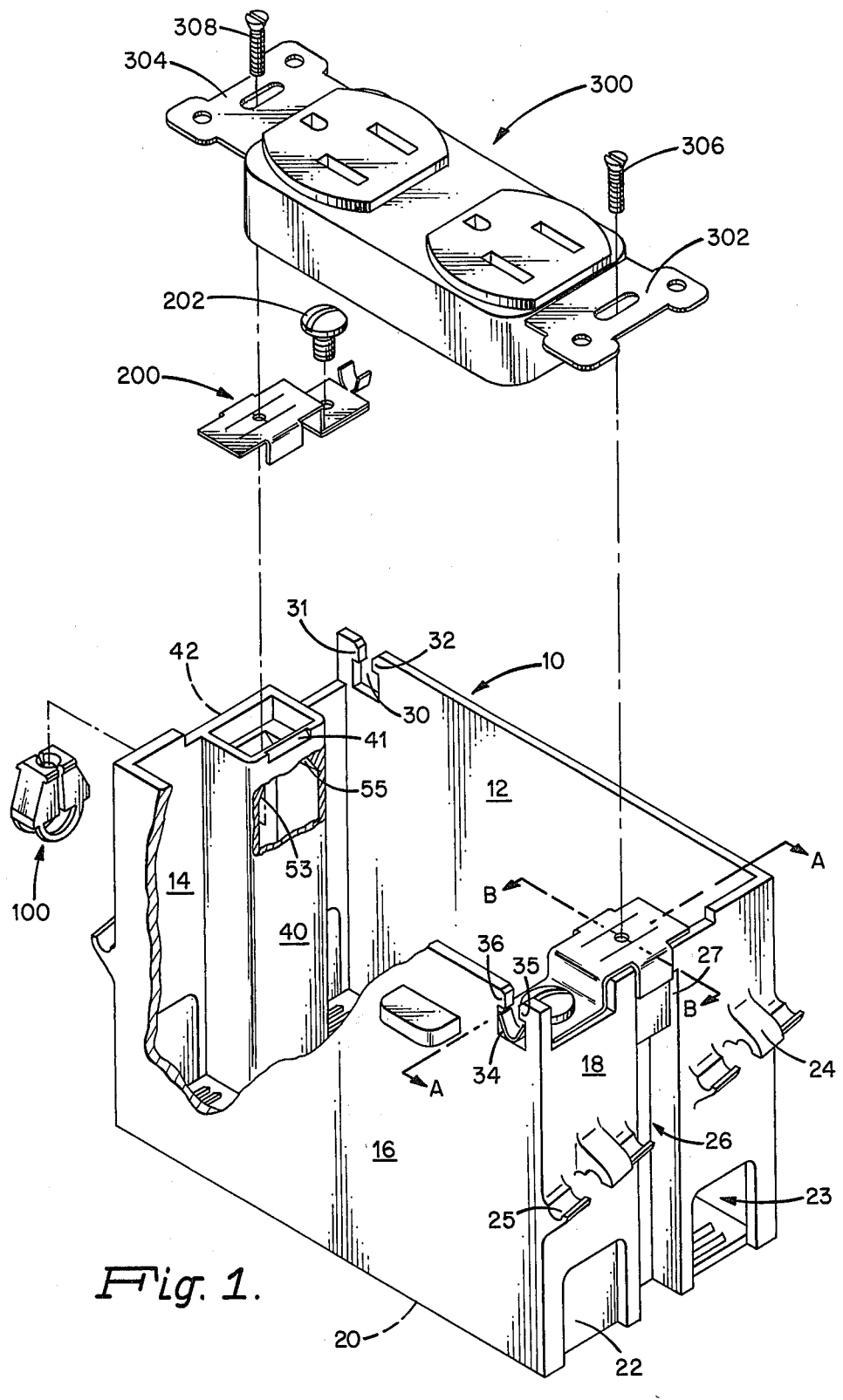
FIG. 1 is an exploded, partially cut-away perspective view of an electrical wiring box arrangement in accordance with the present invention.

Referring to FIG. 1, a preferred embodiment of an electrical wiring box arrangement in accordance with the present invention is shown in exploded and cut-away view. The wiring box 10 comprises front-to-rear side walls 12 and 16 and end walls 14 and 18. Rear wall 20 connects the front-to-rear wall structure to form a box chamber with a forward facing opening for mounting an electrical wiring device such as that represented by duplex outlet 300.

The wiring box 10 is preferably manufactured by conventional molding techniques of a plastic or resinous material such as polyethylene, polypropylene, polytetrafluoroethylene, polyvinyl chloride, phenolformaldehyde resin or the like. The box may be provided with integrally molded features such as nail-up lugs 24 and 25 and frangible knock-outs such as 22.

Each end wall of the wiring box 10 is provided with an indentation which forms an external channel in the wiring box walls as typified by channel 26 in box end wall 18. While shown in the embodiment illustrated by FIG. 1 as a channel running the entire length of the box end wall, the channel may alternatively run only a portion of the end wall from the forward facing opening of the box to the box rear wall.

As can be best seen in the exploded view of FIG. 1, the gripping member 100 of a preferred embodiment of the present invention is received slideably in the box end wall channel. The gripping member 100 is inserted laterally into the box wall channel and may thereafter be slideably moved in the channel.

The box end wall channel terminates at the end nearest the forward facing opening of the wiring box with an arrangement which prevents the gripping member 100 from moving out of the channel in a direction toward the forward facing opening.

Figure 4:
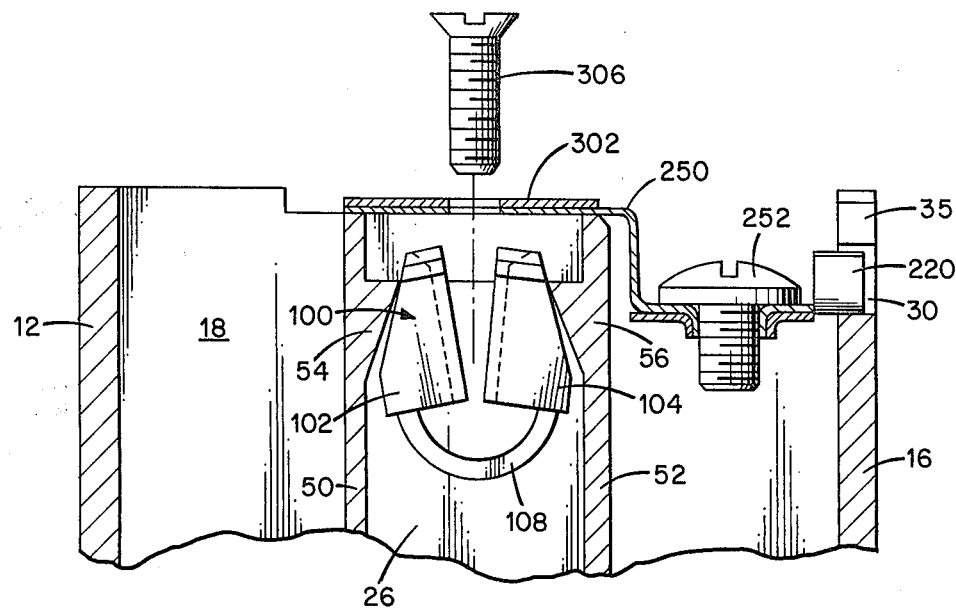
FIGS. 4 and 5 are partial cut-away views of the wiring box arrangement of FIG. 1, taken along the cut A—A.
Figure 5:
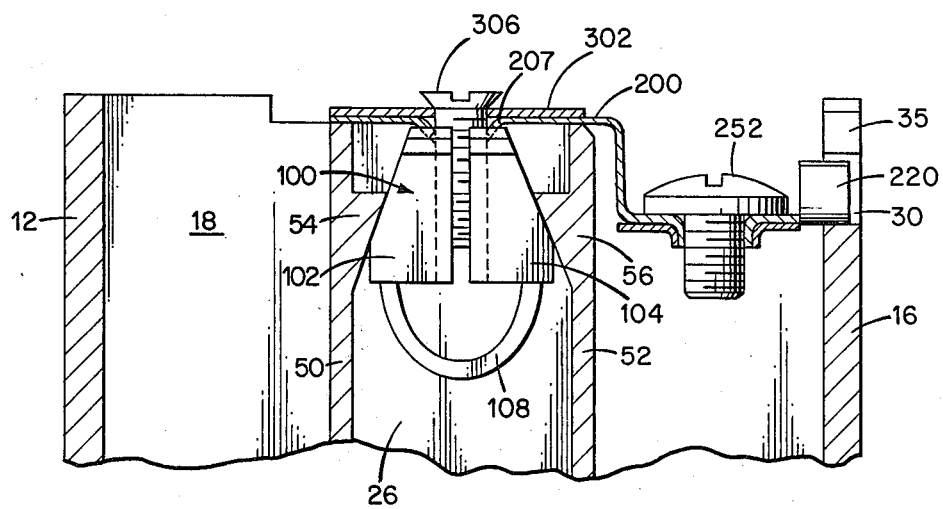

The details of this arrangement can best be seen by reference to FIGS. 4 and 5 where the end wall of the box is shown in partial cross-section with the cut taken along the line A—A of FIG. 1. The upper end of channel 26 is provided with one or more protrusions which prevent the gripping member 100 from moving out of the channel 26 in a direction toward the forward facing opening of the box 10. In a preferred embodiment of the invention, these protrusions in the box wall channel 26 take the form of inwardly sloping portions 54 and 56 of the box wall channel 26.

Movement of the gripping member 100 in the box wall channel 26 in a direction toward the forward facing opening causes the inwardly sloping wall portions 54 and 56 of the channel 26 to bear against the sloping surfaces of gripping member portions 102 and 104 urging one portion toward the other.

When used to mount an electrical wiring device such as duplex receptacle 300 in wiring box arrangements of this invention, gripping member 100 receives the attachment screw 306 of the wiring device and initially lightly grips the threads of the screw 306. As the mounting screw is turned to tighten down the mounting lug 302 of the wiring device, gripping member 100 is drawn through channel 26 toward the mounting lug 302. This movement causes the sloping box channel wall portions 54 and 56 to bear against members 102 and 104 of the gripping member 100, in turn causing members 102 and 104 to bear against the threads of the mounting screw 306 which as a result bite more firmly into the gripping member 100. Thus, as the mounting screw or bolt of the wiring device is turned to tighten down the wiring device mounting lug, the gripping member 100 increasingly tightly grips the wiring device mounting screw or bolt, insuring a firm mechanical grip between the wiring device and box. In the event that the wiring device is later removed and replaced, the action of the gripping member is repeated, assuring a firm grip on the screw or bolt of the replaced wiring device.

Gripping member 100 is preferably made of a moldable plastic material such as nylon, polyethylene, polypropylene, polytetrafluoroethylene, polyvinyl chloride or similar thermoplastic material. As can be best seen by referring to FIG. 2, the gripping member is made of two segments or body portions 102 and 104 with sloping surfaces 122 and 124. In an alternative embodiment of the invention, sloping surfaces 122 and 124 may be molded in a roughened or serrated form with the inwardly sloping walls 54 and 56 of the box wall channel 26 similarly roughened or serrated to provide a firmer grip.

Each body portion 122 or 124 of gripping member 100 is provided with curved surfaces opposite to the sloping surfaces 122 and 124 on each body portion which when opposed provide an essentially cylindrical region 105 between the portions. This cylindrical or tubular region 105 receives the mounting screw or bolt of the wiring device. In alternative embodiments of the invention, one or more of these curved inner surfaces of gripping member 100 may be serrated or threaded to more firmly engage the threads of the wiring device mounting screw or bolt.

Figure 2:
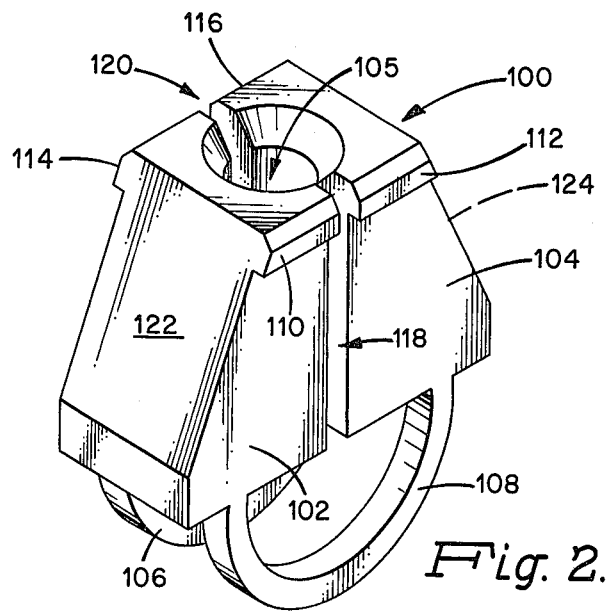
FIG. 2 is a detailed perspective view of a gripping member in accordance with one embodiment of a wiring box arrangement of the present invention.
Figure 3:
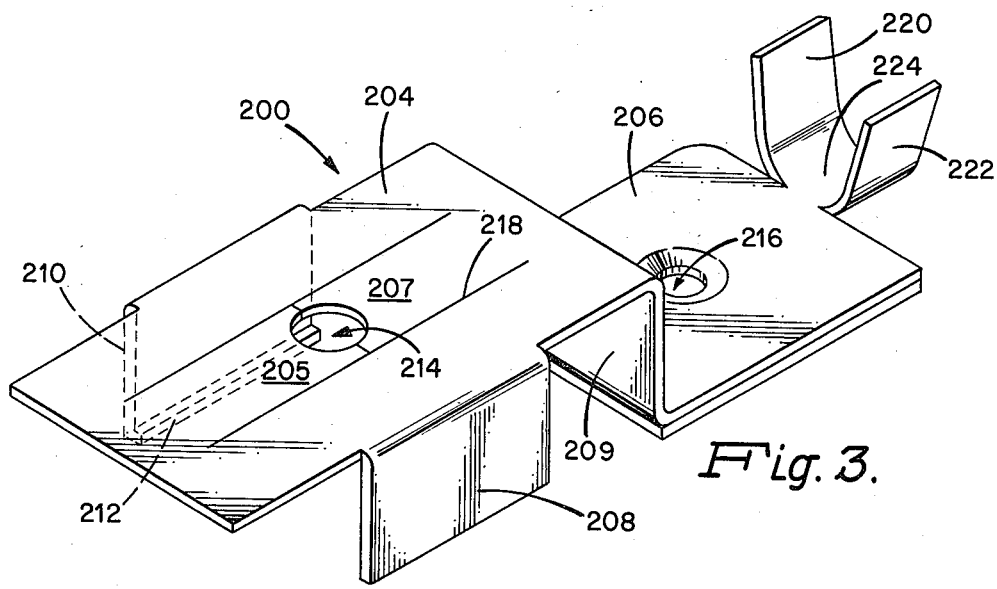
FIG. 3 is a detailed perspective view of a grounding member in accordance with one embodiment of a wiring box arrangement of the present invention.

In the embodiment of the invention pictured in FIG. 2, the two body portions 102 and 104 of gripping member 100 are shown attached to one another by tethers or tie straps 106 and 108. The tethers provide the dual function of tying the two portions of the unitary gripping member 100 together as well as providing a biasing action which tends to force the two body portions 102 and 104 outward and away from each other. This latter action assures that gripping member 100 fits snugly in the box wall channel prior to receiving the wiring device screw or bolt. This biasing action further holds the gripping member 100 in the channel in a slightly canted position prior to the insertion of the wiring device mounting screw as can best be seen by reference to FIG. 4. The two body portions 102 and 104 of the gripping member 100 are held in the wiring box wall channel by the action of the tether straps 106 and 108 in such a position that the lower ends of the two body members are closer together than the upper ends. In this canted position, the spacing between the two body members 102 and 104 at the top is greater than the standard diameter of the mounting screw 306, while the spacing at the bottom is less than the screw diameter. This insures that when the mounting screw 306 is initially inserted into the wiring box wall channel, it lightly engages the two halves of the gripping member 100. The screw 306 can be pushed through the gripping member 100 without the need for turning the screw. The retaining clips on the upper ends of the two body portions of the gripping member hold the member in place, as is discussed further below, to prevent movement of the gripping member along with the screw during insertion. When the entire length of the mounting screw has been pushed into the receiving gripping member, turning the screw draws the member up tightly as can best be seen in FIG. 5. As the gripping member is drawn upward into the wiring box channel, the sloping wall protrusions 54 and 56 push inward against the two body portions 102 and 104 of the gripping member 100, forcing them together against the mounting screw 306.

Figure 6:
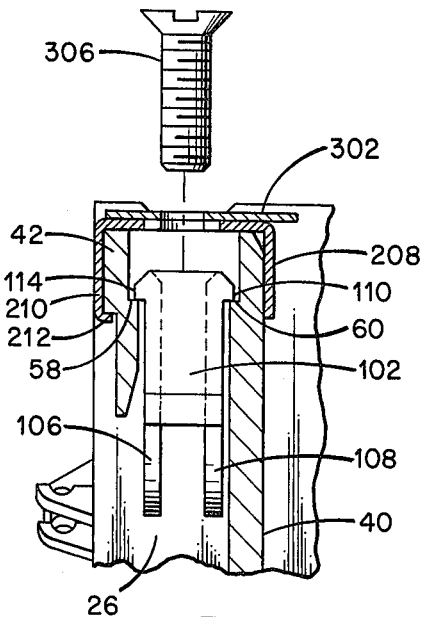
FIGS. 6 and 7 are partial cut-away views of the wiring box arrangement of FIG. 1, taken along the cut B—B.
Figure 7:
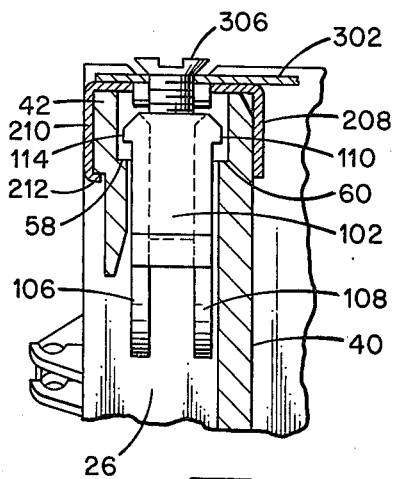

Additional features of gripping member 100 are shown in FIG. 2 where snap or clip portions 110 and 114 of body portion 102 and corresponding elements 112 and 116 of body portion 104 are depicted. The action of these snap or clip portions can best be seen by reference to FIGS. 6 and 7 which show a partial cutaway view of the wiring box arrangement of FIG. 1 taken along the line B—B.

In the lateral view of box wall channel 26 shown in these Figures, it can be seen that the upper end of the channel has a box wall portion 42 which bridges across the external channel in the box end wall. (This bridging portion of the box end wall can also be seen as element 42 in box end wall 14 in FIG. 1.) The inner face of bridging wall portion 42 provides a ledge or protrusion 58 which engages clip or snap 114 of body member 102 of the gripping member 100. In a similar fashion, box channel wall 40 is provided on its inner surface with ledge or protrusion 60 which bears against clip or snap 110 of body portion 102 retaining gripping member 100.

These features of the inner walls of the box channel permit the gripping member 100 to be slideably inserted in the channel and clipped lightly into place prior to the mounting of a wiring device in the box. The snaps or clips 110, 112, 114, and 116 coacting with ledges or protrusions 58 and 60 of the walls of box wall channel 26 temporarily and lightly hold the gripping member 100 in place in the channel prior to the mounting of the wiring device in the box arrangement.

The cooperative action of the various elements of wiring box arrangements in accordance with the present invention can best be seen by reference to FIG. 5. Wiring device mounting screw or bolt 306 is shown passing through the mounting aperture of yoke 302 of the wiring device and then through the central aperture in the H-shaped cut of grounding member 200 which is disclosed and claimed in co-pending application Serial No. 310,712 filed concurrently herewith. Tabs 205 and 207 of the grounding member have been deformed downward and tightly engage the mounting screw 306 providing both efficient mechanical and electrical contact. In FIG. 5, mounting screw 306 is shown fully tightened down in which position it has drawn gripping member 100 upward in the channel 26. Sloping channel wall portions 54 and 56 bear against the body members 102 and 104 of the gripping member 100 causing it in turn to tightly grip the threads of mounting screw 306. The leg portions of the U-shaped clip portion of the grounding member, illustrated in cross-section cutaway by leg 220, are snapped into place in wall retaining notch 34, held in place by protrusions 35 and 36.

Electrical wiring box arrangements in accordance with the present invention thus provide an efficient and effective means for mounting electrical wiring devices in non-metallic wiring boxes while simultaneously providing for firm mechanical mounting of the wiring device in the box.

While there have been shown and described what are at present believed to be the preferred embodiments of the present invention, it will be obvious to those skilled in the art that various changes and modifications may be made therein without departing from the scope of the invention as defined by the appended claims.

What is claimed is:

1. An electrical wiring box arrangement including an electrical wiring box and a unitary gripping member for engaging the mounting screw of an electrical wiring device mounted in said wiring box;
    said electrical wiring box comprising:
        a wall structure of front-to-rear walls and a rear wall therebetween which together define a chamber with a forward facing opening for receiving an electrical wiring device;
        said wall structure including support means for seatably receiving and supporting a yoke member of an electrical wiring device;
        said wall structure further including mounting means adjacent to said support means for slideably mounting and retaining said gripping member in said wiring box wall structure;
    said unitary gripping member comprising:
        two opposed body portions each having a face for coacting with said mounting means of said wiring box wall structure;
        said opposed body portions each having a curved face for coacting with the mounting screw of said wiring device; and
        resilient biasing means for urging said opposed body portions into contact with said mounting means and causing portions of the curved faces of the opposed body portions to be spaced apart by less than the diameter of the mounting screw of said wiring device;
    whereby a yoke member of a wiring device mounted in said wiring box is seatably received and supported on said support means, the mounting screw of said wiring device passes through said yoke member and betwen said opposed body portions of said gripping member retained in said wiring box wall structure mounting means into engagement with the portion of the curved faces of the opposed body portions which are spaced apart by less than the diameter of the mounting screw, and said mounting screw is firmly engaged by the cooperative action of said mounting means of said wall structure urging said opposed gripping member body portions toward one another to tightly grip the mounting screw upon turning of the screw.

2. An electrical wiring box arrangement in accordance with claim 1 wherein said resilient biasing means comprises a flexible and resilient tether strap joining said body portions of said gripping member.

3. An electrical wiring box arrangement in accordance with claim 2 wherein said mounting means includes stop means at an end nearest said forward facing opening of said box for preventing movement of said gripping means out of said mounting means in a direction from said rear wall toward said forward facing opening.

4. An electrical wiring box arrangement in accordance with claim 3 wherein said stop means comprises a protrusion to engage said gripping means against movement out of said mounting means in a direction toward said forward facing opening of said wiring box.

5. An electrical wiring box arrangement in accordance with claim 4 wherein said protrusion comprises inwardly inclined portions of opposed walls of said mounting means whereby movement of said gripping means slideably in a direction toward said forward facing opening of said wiring box urges said opposed body portions of said gripping member toward one another to retain said gripping member in said mounting means.

6. An electrical wiring box arrangement in accordance with claim 5 wherein at least one of said curved faces of said opposed body portions of said gripping member is provided with thread engaging means to engage the threads of the mounting screw of said electrical wiring device.

7. An electrical wiring box arrangement in accordance with claim 6 wherein said mounting means in said box wall structure comprises an indentation in said front-to-rear wall structure of said box providing a channel on the exterior face of said front-to-rear wall structure, said channel running a portion of the length of said front-to-rear wall structure from said forward facing opening to said rear wall and adapted to slideably receive said gripping member.

8. An electrical wiring box arrangement comprising:
    an electrical wiring box and a unitary gripping member for gripping the mounting screw of an electrical wiring device;
    said wiring box comprising:
        front-to-rear walls and a rear wall therebetween which in combination define a chamber with a forward facing opening for receiving an electrical wiring device;
        said front-to-rear wall structure including an indentation running a portion of the distance of said front-to-rear wall from said forward facing opening to said rear wall to provide a channel for slideably receiving said gripping member;
        said channel having biasing means for retaining said gripping member in said channel against outward removal from said channel in a direction toward said forward facing opening of said wiring box;
    said unitary gripping member comprising:
        two opposed body portions each having a sloping face for coacting with said biasing means of said channel to urge said opposed body portions toward one another upon movement of the gripping member in said channel in a direction toward said forward facing opening of said wiring box;

each body portion having a curved face for coacting with the mounting screw of said electrical wiring device; and resilient biasing means for urging said opposed body portions into contact with said biasing means of said channel and causing portions of the curved faces of the opposed body portions to be spaced apart by less than the diameter of the mounting screw of said electrical wiring device; whereby a mounting yoke of an electrical wiring device mounted in said wiring box arrangement is received and supported by the end of said channel in said wiring box wall structure, the mounting screw of said wiring device passes into said channel and is received between the curved faces of said opposed body portions of said gripping member in engagement with the portions of the curved faces which are spaced apart by less than the diameter of the mounting screw, and said mounting screw is further engaged and retained by the cooperative action of said biasing means of said channel urging said body portions toward one another to tightly grip the mounting screw upon turning of the screw.

9. An electrical wiring box arrangement in accordance with claim 8 wherein said biasing means comprises inwardly sloping protrusions on the walls of said channel which coact with said sloping faces of said body portions of said gripping member, urging said body portions toward one another when said gripping member is moved in said channel in a direction toward said forward facing opening of said box.

10. An electrical wiring box arrangement in accordance with claim 9 wherein said resilient biasing means comprises a flexible and resilient tether strap joining said body portions of said gripping member.

11. An electrical wiring box arrangement in accordance with claim 10 wherein said front-to-rear wall structure is provided with a portion of said wall bridging said channel.

12. An electrical wiring box arrangement in accordance with claim 11 wherein the inner surfaces of said bridging portion of said front-to-rear wall structure and of said box wall channel are provided with protrusions adapted to coact with protrusions provided on said gripping member to retain said gripping member in said box wall channel against movement in a direction toward said box rear wall.

* * * * *